United States Patent
Broadwell

(10) Patent No.: US 9,440,597 B1
(45) Date of Patent: Sep. 13, 2016

(54) TEMPORARY VEHICLE PLATE ATTACHMENT SYSTEM AND RELATED METHOD

(71) Applicant: Brian Keith Broadwell, Titusville, FL (US)

(72) Inventor: Brian Keith Broadwell, Titusville, FL (US)

(*) Notice: Subject to any disclaimer, the term of this patent is extended or adjusted under 35 U.S.C. 154(b) by 35 days.

(21) Appl. No.: 14/662,804

(22) Filed: Mar. 19, 2015

Related U.S. Application Data

(60) Provisional application No. 61/955,375, filed on Mar. 19, 2014.

(51) Int. Cl.
| | | |
|---|---|---|
| *G09F 7/04* | (2006.01) |
| *B60R 13/10* | (2006.01) |
| *G09F 7/18* | (2006.01) |
| *G09F 21/04* | (2006.01) |

(52) U.S. Cl.
CPC ............ *B60R 13/105* (2013.01); *G09F 7/04* (2013.01); *G09F 2007/1852* (2013.01); *G09F 2007/1895* (2013.01); *G09F 2021/041* (2013.01)

(58) Field of Classification Search
CPC ..... B60R 13/105; B60R 13/10; B60R 13/00; G09F 7/18; G09F 7/04; G09F 19/22; G09F 2019/223; G09F 1/10; G09F 7/10; B60Q 1/56

See application file for complete search history.

(56) References Cited

U.S. PATENT DOCUMENTS

| | | | |
|---|---|---|---|
| 2,802,292 A * | 8/1957 | Bader | 40/591 |
| 3,206,883 A | 9/1965 | Crawford | |
| 3,230,653 A | 1/1966 | Rice | |
| 3,965,599 A * | 6/1976 | Ebner | 40/711 |
| 4,177,305 A * | 12/1979 | Feingold et al. | 428/13 |
| 7,877,908 B2 | 2/2011 | Collins | |
| 8,281,508 B1 | 10/2012 | Wiskow | |
| 8,438,765 B2 | 5/2013 | Sanders | |
| 2007/0069089 A1 | 3/2007 | Christopherson | |
| 2011/0239496 A1* | 10/2011 | Sanders | 40/209 |

FOREIGN PATENT DOCUMENTS

| | | | | |
|---|---|---|---|---|
| DE | 20021963 U1 * | 4/2001 | | A47G 1/06 |
| EP | 001692985 A1 * | 8/2006 | | |
| EP | 2206630 | 7/2010 | | |
| JP | 2004168270 A * | 6/2004 | | |

* cited by examiner

*Primary Examiner* — Cassandra Davis
(74) *Attorney, Agent, or Firm* — Allen Dyer Doppelt Milbrath & Gilchrist, P.A.

(57) ABSTRACT

A temporary vehicle plate attachment system includes a first plate frame adapted for mounting to a vehicle license plate receiving area, the first plate frame having a plurality of opposed corners with a magnetic member positioned adjacent to each corner and a second plate frame having a plurality of opposed corners with a magnetic member positioned adjacent to each corner and arranged in substantially the same relative geometry as the magnetic members of the first plate frame. The second plate frame is attached to the first plate frame by aligning the magnetic members. A method of attaching a temporary plate includes fastening the first plate frame to a vehicle license plate receiving area, magnetically attaching the second plate frame to the first plate frame and positioning a temporary vehicle plate against an outer surface of the second plate frame such that the temporary vehicle plate is visible.

15 Claims, 4 Drawing Sheets

TEMPORARY VEHICLE PLATE ATTACHMENT SYSTEM AND RELATED METHOD

FIELD OF THE INVENTION

The present invention relates to vehicle plate attachment systems, and more particularly, to temporary vehicle plate attachment systems.

BACKGROUND OF THE INVENTION

License plates are typically attached by screwing them onto the rear of the vehicle. Although this keeps the license plate securely attached to the vehicle when driving, screwing and unscrewing license plates gets cumbersome when the plates need to be removed or replaced over and over. Car dealers, for example, are constantly placing temporary plates on their cars prior to test drives. Needing to screw a temporary tag onto a car prior to a test drive is time-consuming and inefficient.

Vehicle dealers avoid this problem by attaching a temporary license plate holder to the vehicle. The license plate holder is temporarily affixed to the car so that the dealer can easily attach and remove the dealer plate from the vehicle without screwing it on. One temporary means of attachment is a magnet affixed to the dealer plate, which is used by attaching the magnet to a steel part of the vehicle.

This attachment means has some considerable drawbacks. One drawback is that the magnet slides against the steel part of the vehicle to which it is attached, scraping the vehicle and damaging its decorative finish. Another drawback is that modern car bodies and bumpers may not be made out of steel, leaving the magnet nowhere to stick.

SUMMARY OF THE INVENTION

In view of the foregoing, it is an object of the present invention to provide an improved temporary vehicle plate attachment system and related method.

According to an embodiment of the present invention, a temporary vehicle plate attachment system includes a first plate frame adapted for mounting to a vehicle license plate receiving area, the first plate frame having a plurality of opposed corners with a magnetic member positioned adjacent to each corner and a second plate frame having a plurality of opposed corners with a magnetic member positioned adjacent to each corner and arranged in substantially the same relative geometry as the magnetic members of the first plate frame. The second plate frame is attachable to the first plate frame by aligning the magnetic members of the second plate frame with the magnetic members of the first plate frame.

According to a method aspect, a method of using a temporary vehicle plate attachment system includes fastening a first plate frame to a vehicle license plate receiving area, magnetically attaching a second plate frame to the first plate frame and positioning a temporary vehicle plate against an outer surface of the second plate frame such that the temporary vehicle plate is visible.

These and other objects, aspects and advantages of the present invention will be better understood in view of the drawing and following detailed description of preferred embodiments.

DETAILED DESCRIPTION OF PREFERRED EMBODIMENTS

The Summary of the Invention and Detailed Description of the Preferred Embodiments refer to particular features (including method steps) of the invention. Where a particular feature is disclosed in the context of a particular aspect or embodiment of the invention, that feature can also be used, to the extent possible, in combination with and/or in the context of other particular aspects and embodiments of the invention, and in the invention generally.

In this section, the invention is described more fully with reference to a preferred embodiment. This invention may, however, be embodied in many different forms and should not be construed as limited to the embodiment set forth herein.

Figure 1:
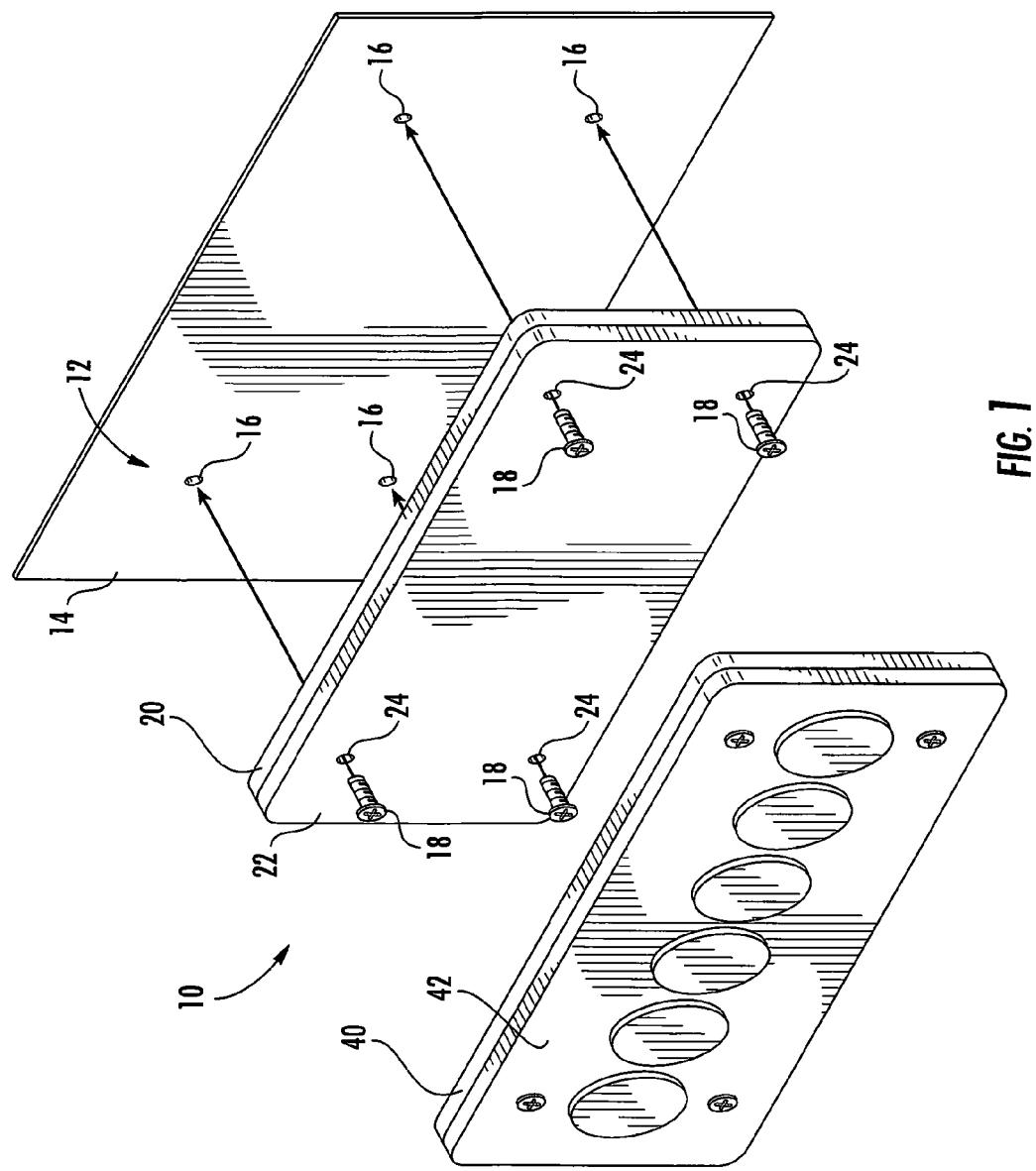
FIG. 1 is a perspective view of a temporary vehicle plate attachment system according to an embodiment of the present invention.
Figure 2:
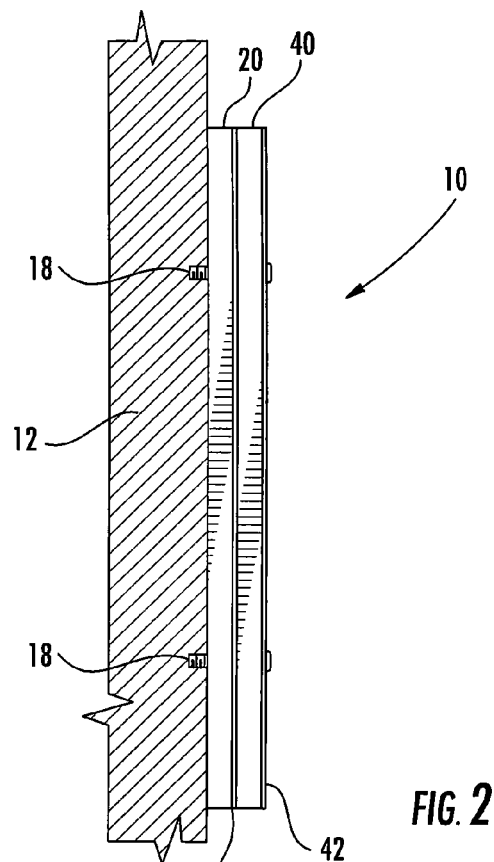
FIG. 2 is a top view of the temporary vehicle plate attachment system of FIG. 1, attached to a vehicle.
Figure 3:
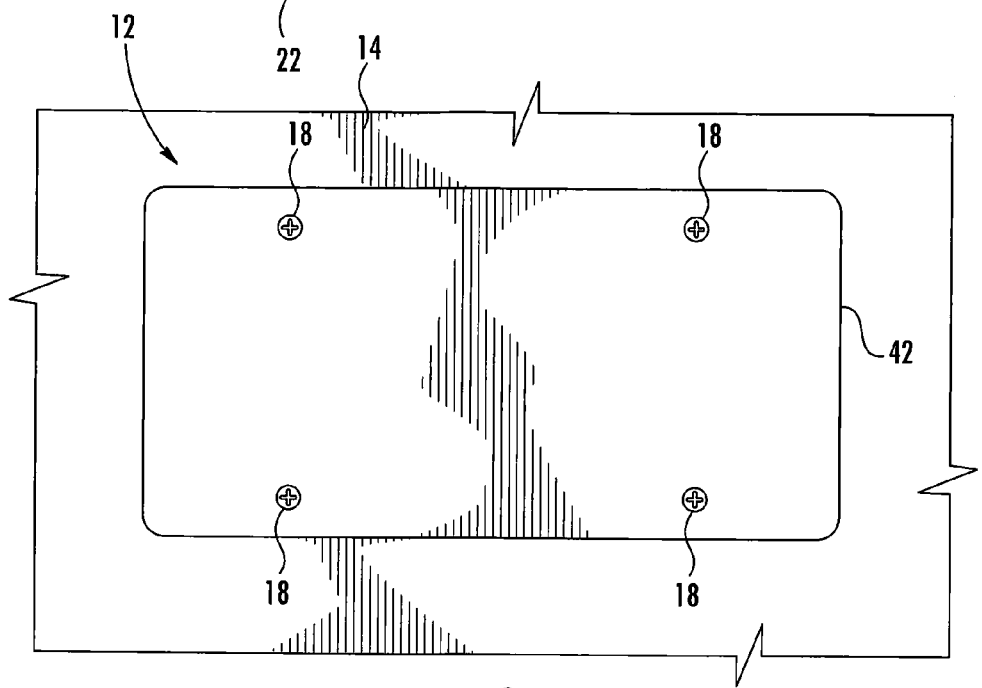
FIG. 3 is a front view of the temporary vehicle plate attachment system of FIG. 1, attached to the vehicle.

A temporary vehicle plate attachment system 10, according to an embodiment of the invention is generally shown in FIGS. 1-3. The temporary vehicle plate attachment system 10 includes a first plate frame 20 and a second plate frame 40. The first plate frame 20 has a first plate 22 attached thereto. The second plate frame 40 has a second plate 42 attached thereto.

The first plate frame 20 is adapted to attach to a license plate receiving area 12 of a vehicle 14. On most vehicles, the license plate receiving area 12 is equipped with threaded holes 16 into which mating threaded fasteners 18 are inserted to secure a license plate to the vehicle. For this reason the first plate frame 20 includes a plurality of through holes 24 that allow the threaded fasteners 18 to pass therethrough so that the first plate frame 20 and first plate 22 can be secured to the vehicle. The threaded fasteners 18 also help secure the first plate 22 to the first plate frame 20.

Because the first plate frame 20 is attached to the vehicle with the threaded fasteners 18, the first plate 22 is a plate that typically stays attached to the vehicle. Such plates can include the vehicle's license plate or a placeholder plate attached to the vehicle before the vehicle is sold. The first plate 22 is optional. If the vehicle does not have a license plate assigned to it or the user does not want to use a placeholder plate, the second plate frame 40 can be attached directly to the first plate frame 20.

Figure 4:
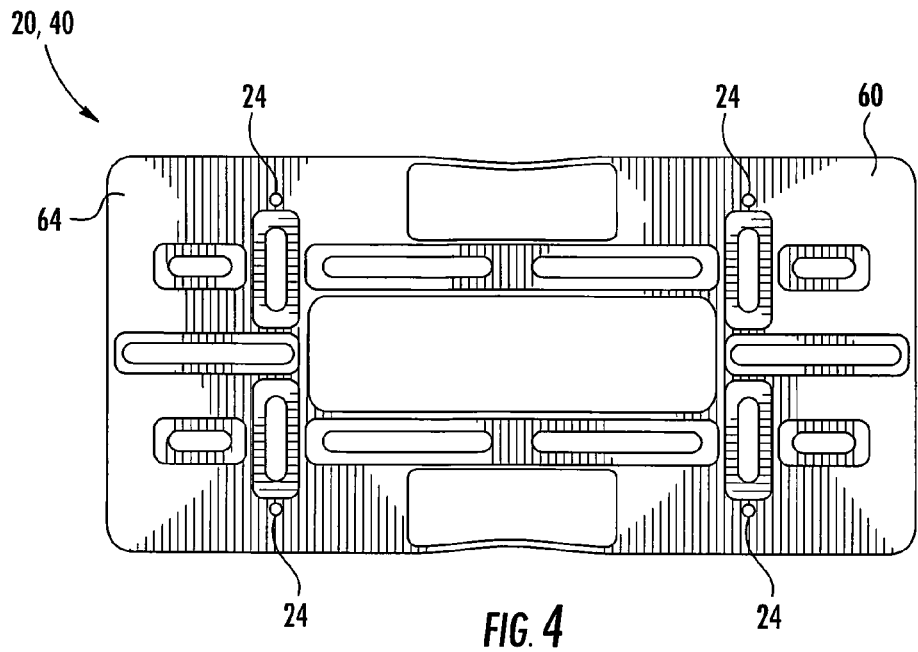
FIG. 4 is a front view of a plate frame of the temporary vehicle plate attachment system of FIG. 1.
Figure 5:
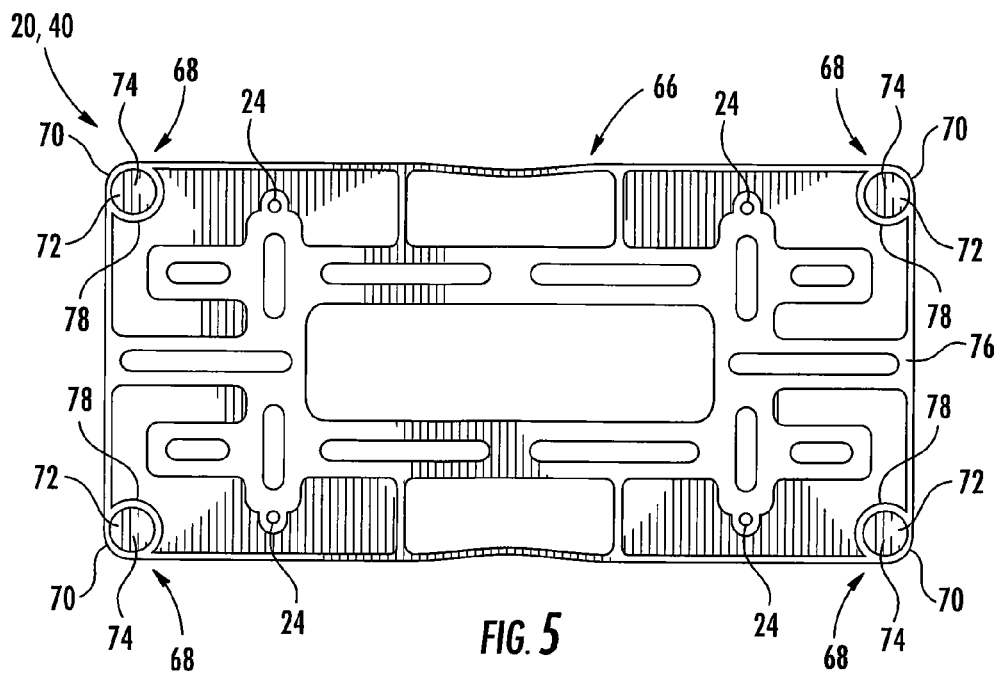
FIG. 5 is a back view of the plate frame of FIG. 4.

In the embodiment shown, the first and second plate frames 20, 40 are substantially identical. FIGS. 4 and 5 show an example of a first plate frame 20 and a second plate frame 40 without a plate attached.

The first and second plate frames 20, 40 each includes a front side 60 having a substantially flat plate abutment surface 64 formed thereon. When a plate is installed, it abuts the plate abutment surface 64, which prevents the plate from bending or warping.

The first and second plate frames 20, 40 each also includes a back side 66 having a plurality of magnet receiving areas recessed therein 68. The magnet receiving areas 68 are positioned adjacent opposed corners 70 of the plate frame 20, 40. The receiving areas 68 are recessed far enough into the back side 66 such that a magnetic member 72 can sit substantially completely within the plate frame 20, 40. A top end 74 of the magnetic member 72 is preferably either flush with or below a rim 76 defining each recessed magnet receiving area 68.

The magnetic members 72 are positioned adjacent opposed corners 70 to magnetically align different plate frames 20, 40 when they are stacked together, as shown in FIG. 2. Doing so also positions the second plate frame 40 so that it substantially covers the first plate frame 20 and, if present, the first plate 22.

The magnetic members 72 are made of one or more magnets. The magnets are strong enough to be able to maintain cooperation and alignment between first and second plate frames 20, 40 when the vehicle on which the temporary vehicle plate attachment system 10 is installed is moving. Conventional neodymium rare earth magnets are preferred, but are not necessarily the only type of magnet that can be used.

The magnetic members 72 in the embodiment shown are cylinder-shaped. This shape fits closely against the rim 76 in each corner 70. Magnetic poles are oriented along the cylindrical axis so that the magnetic members 72 of the second plate frame 40 easily and automatically align with the magnetic members 72 of the first plate frame 20. It is to be understood, however, that the magnetic members 72 are not limited to this particular shape.

The magnetic members 72 are affixed to their respective magnet receiving areas 68 using a fixation mechanism. In the preferred embodiment, the fixation mechanism is an adhesive 78. If a stack of magnets is used, the adhesive 78 may also be used to secure the stacked magnets together.

Figure 6:
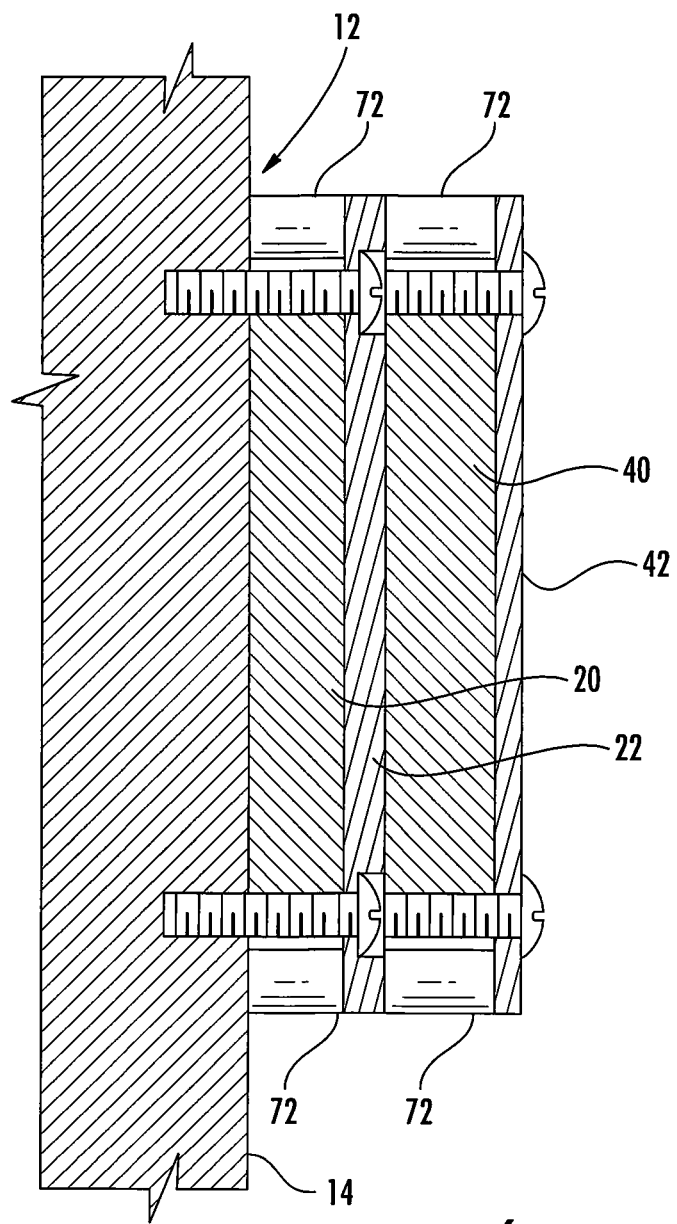
FIG. 6 is a side cutaway view of the temporary vehicle plate attachment system of FIG. 1, attached to the vehicle.

FIG. 6 is a cutaway view of the system 10 installed on the vehicle 14. The respective magnetic members 72 of the first and second plate frames 20, 40 are aligned end to end so that the second plate frame 40 is held to the vehicle 14 by the magnetic members 72 of the first plate frame 20.

The temporary vehicle plate attachment system 10 may be used many different ways. A few of the possible uses are now described.

Vehicle dealers can use the temporary vehicle plate attachment system 10 to rapidly attach and detach temporary license plates to/from their vehicles. The dealer first attaches the first plate frame 20 with the optional first plate 22 to the license plate receiving area 12 of the vehicle 14 by inserting the threaded fasteners 18 into the threaded holes 16. The first plate frame 20 remains on the vehicle while in the dealer's possession. When the vehicle needs to be driven, the dealer attaches the second plate frame 40 with a temporary license plate serving as the second plate 42. Once the drive is over, the dealer can remove the second plate frame 40 without needing to unscrew any fasteners from the vehicle.

Law enforcement can also use the temporary vehicle plate attachment system 10 to rapidly attach and detach temporary license plates to/from their vehicles. Law enforcement personnel often use temporary license plates positioned over the vehicle's legally assigned license plate to hide the legally assigned license plate and prevent bad actors from being able to identify a law enforcement vehicle by its legally assigned license plate number.

In this scenario, law enforcement personnel can attach the first plate frame 20 to the vehicle, where the first plate 22 is the license plate legally assigned to the vehicle by attaching the first plate frame 20 with the license plate to the license plate receiving area 12 of the vehicle 14 by inserting the threaded fasteners into the threaded holes 16. The first plate frame 20 remains on the vehicle. When law enforcement personnel drive the vehicle into a discrete investigation or a crime scene, they attach the second plate frame 40 with a temporary plate as the second plate 42 to the first plate frame 20. When they leave, they simply remove the second plate frame 40 without needing to unscrew any fasteners from the vehicle.

Show vehicle owners can also use the system 10 to rapidly attach and detach a plate that shows information about the show vehicle at events such as car shows or the like. This is achieved by displaying such information on the second plate 42. The information may include vehicle make and model and any other interesting information about the vehicle that the owner desires to display.

In this scenario, the owner can attach the first plate frame 20 to the vehicle, where the first plate 22 is the license plate legally assigned to the vehicle by attaching the first plate frame 20 with the license plate to the license plate receiving area 12 of the vehicle 14 by inserting the threaded fasteners 18 into the threaded holes 16. The first plate frame 20 remains on the vehicle. When the owner shows the vehicle at the show, the owner attaches the second plate frame 40 with the second plate 42 to the first plate frame 20. When the owner leaves with the vehicle leave, he/she simply removes the second plate frame 40 without needing to unscrew any fasteners from the vehicle.

From the foregoing, it will be appreciated that a temporary vehicle plate attachment system according to the present invention eliminates the risk of damaging vehicles, while easily replacing vehicle plates.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A temporary vehicle plate attachment system comprising:
   a first plate frame adapted for mounting to a vehicle license plate receiving area, the first plate frame having a plurality of opposed corners with a magnetic member positioned adjacent to each corner; and
   a second plate frame having a plurality of opposed corners with a magnetic member positioned adjacent to each corner and arranged in substantially the same relative geometry as the magnetic members of the first plate frame;
   wherein the second plate frame is attachable to the first plate frame by aligning the magnetic members of the second plate frame with the magnetic members of the first plate frame; and
   wherein the first plate frame defines a plurality through holes, such that threaded fasteners can be inserted therethrough to secure the first plate frame;
   wherein the first and second plate frames each includes a back side having a plurality of magnet receiving areas recessed therein; and
   wherein a top end of the magnetic member is flush with or below a rim defining each of the plurality of magnet receiving areas.

2. The temporary vehicle plate attachment system of claim 1, wherein the first and second plate frames each includes a front side having a substantially flat plate abutment surface formed thereon.

3. The temporary vehicle plate attachment system of claim 1, wherein the magnetic member is affixed to its respective magnet receiving area with an adhesive.

4. The temporary vehicle plate attachment system of claim 1, further comprising
a second plate attached to the second plate frame.

5. The temporary vehicle plate attachment system of claim 4, further comprising a first plate attached to the first plate frame.

6. The temporary vehicle plate attachment system of claim 5, wherein the first plate is a license plate legally assigned to a vehicle.

7. The temporary vehicle plate attachment system of claim 1,
wherein the first and second plate frames are substantially identical.

8. The temporary vehicle plate attachment system of claim 1, wherein, when the second plate frame is attached to the first plate frame, the second plate frame substantially covers the first plate frame.

9. The temporary vehicle plate attachment system of claim 1, wherein the magnetic members include magnets sufficiently strong to maintain alignment between the first and second plate frames when the vehicle is moving.

10. The temporary vehicle plate attachment system of claim 9, wherein the magnets are neodymium rare earth magnets.

11. The temporary vehicle plate attachment system of claim 9, wherein the magnets are cylindrical.

12. The temporary vehicle plate attachment system of claim 4, wherein the second plate is a temporary vehicle plate.

13. A vehicle and temporary vehicle plate attachment system combination, the combination comprising:
a vehicle having a license plate receiving area;
a first plate frame mounted to the vehicle receiving area, the first plate frame including a first plurality of magnetic members;
a second plate frame releasably connected to the first plate frame by a second plurality of magnetic members aligned with the first plurality of magnetic members;
a vehicle plate connected to the second plate frame facing outwardly from the vehicle; and
an additional vehicle plate connected to the first plate frame and substantially covered by the second plate frame and the vehicle plate.

14. The vehicle and temporary vehicle plate attachment system of claim 13, wherein the first plate frame includes a first plurality of corners with a respective one of the first plurality of magnetic members positioned adjacent each of the first plurality of corners.

15. The vehicle and temporary vehicle plate attachment system of claim 14, wherein the second plate frame includes a second plurality of corners with a respective one of the second plurality of magnetic members positioned adjacent each of the second plurality of corners.

* * * * *